Feb. 3, 1970          I. E. LAAS          3,493,922

CAR CALL SIGNALLING SYSTEM

Filed March 7, 1967          7 Sheets-Sheet 1

INVENTOR
ILMAR ERVIN LAAS
BY W. L. Hunter ATTORNEY

Feb. 3, 1970  I. E. LAAS  3,493,922
CAR CALL SIGNALLING SYSTEM
Filed March 7, 1967  7 Sheets-Sheet 2

INVENTOR
ILMAR ERVIN LAAS
BY W. L. Hunter ATTORNEY

Feb. 3, 1970  I. E. LAAS  3,493,922
CAR CALL SIGNALLING SYSTEM
Filed March 7, 1967  7 Sheets-Sheet 3

INVENTOR
ILMAR ERVIN LAAS
BY W. L. Hunter ATTORNEY

Feb. 3, 1970 — I. E. LAAS — 3,493,922
CAR CALL SIGNALLING SYSTEM
Filed March 7, 1967 — 7 Sheets-Sheet 5

INVENTOR
ILMAR ERVIN LAAS

Feb. 3, 1970  I. E. LAAS  3,493,922
CAR CALL SIGNALLING SYSTEM
Filed March 7, 1967  7 Sheets-Sheet 6

INVENTOR
ILMAR ERVIN LAAS
BY *W. L. Hunter* ATTORNEY

INVENTOR
ILMAR ERVIN LAAS

United States Patent Office 3,493,922
Patented Feb. 3, 1970

3,493,922
CAR CALL SIGNALLING SYSTEM
Ilmar Ervin Laas, College Point, N.Y., assignor to Otis Elevator Company, New York, N.Y., a corporation of New Jersey
Filed Mar. 7, 1967, Ser. No. 621,236
Int. Cl. B66b 1/14; G08c 19/30
U.S. Cl. 340—19                              16 Claims

ABSTRACT OF THE DISCLOSURE

An elevator car call signalling and registering system wherein a maximum of ten car-call buttons are provided in conjunction with means for sequentially generating one or more integer designations in the order corresponding to the numerical designation of a called landing and in which means are provided for destroying the generated integer sequence if it is not transmitted to the elevator control system within a predetermined interval.

---

Figure 1:
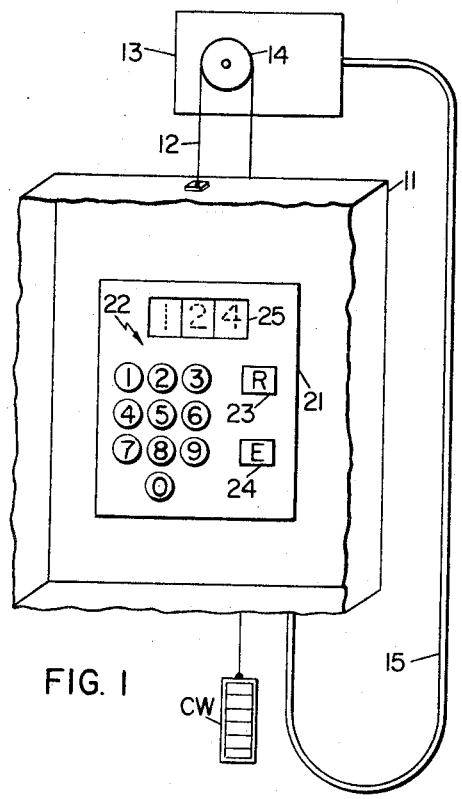

This invention relates generally to elevator control systems and particularly to systems for transmitting, from the car to the machine room, and recording there, signals indicative of the floors at which passengers in the car want the car to stop.

It is common practice to provide the interior of the elevator car with one button for each possible floor stop. Each button, when pressed or touched, changes the voltage on a conductor which extends from the button through the traveling cable in the hoistway to the machine room where it is suitably connected to the remainder of the control mechanism. Such an arrangement is entirely satisfactory in buildings having but a few floors. However, in tall buildings having many floors, a real problem exists in finding sufficient space within the car, readily accessible to entering passengers, for a number of reasonably sized buttons equal to the number of floors in the building. Fortunately most cars do not serve all floors of the building but some cars do serve many floors and frequently one or more cars must be arranged to serve each and every floor. Obviously the problem is especially acute in the latter case.

It is to be noted that the above described system requires a separate hatchway conductor for each button and the large number of conductors required for tall buildings creates additional difficulties.

Although different banks of elevators may be arranged so that each bank serves only a fraction of the total number of floors, thus ameliorating the problem of finding space for the buttons, the number of floors served by different banks varies considerably not only from building to building but also within the same building. Accordingly, it is necessary that the control panels containing the floor buttons be designed and manufactured virtually on an individual basis.

It is a general object of the present invention to provide an improved car call signalling system.

Another object is to provide a car call signalling system in which all necessary buttons can be accommodated in a comparatively small space.

Another object is to provide a car call signalling system in which the number of wires extending from the car to the machine room is greatly reduced.

Another object is to provide a car call signalling system in which the same model of control panel is suitable for use in any elevator car regardless of the number of floors to be served.

Briefly stated, one specific embodiment of the invention comprises a panel mounted in the car and including ten buttons, each marked with one of the digits 0 to 9 inclusive. A passenger selects his floor by first actuating one, or two or even three buttons sequentially. As each button is actuated, a visual display of the corresponding digit is presented and signals representing the digit in binary form are generated. Next the passenger actuates a "Register" button which registers his call by transmitting the binary coded signals to the machine room where they are decoded and stored for use by the control equipment. By this arrangement, the control panel occupies but little space since but ten floor buttons are required. Identical control panels can be used in cars serving any number of floors. The coding system used requires but ten hoistway conductors to transmit signals to the machine room for any number of floors up to 199.

Figure 3:
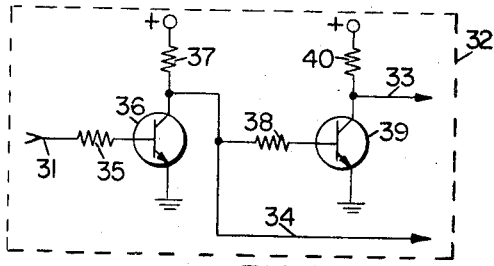
Figure 4:
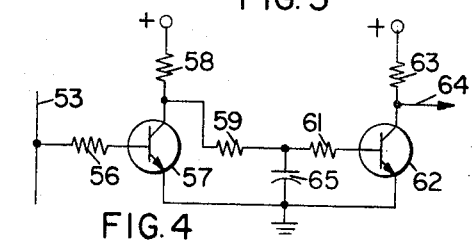
Figure 10:
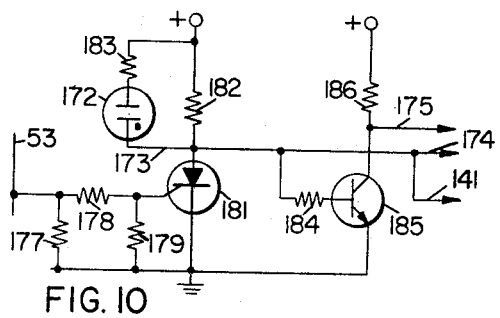
Figure 5:
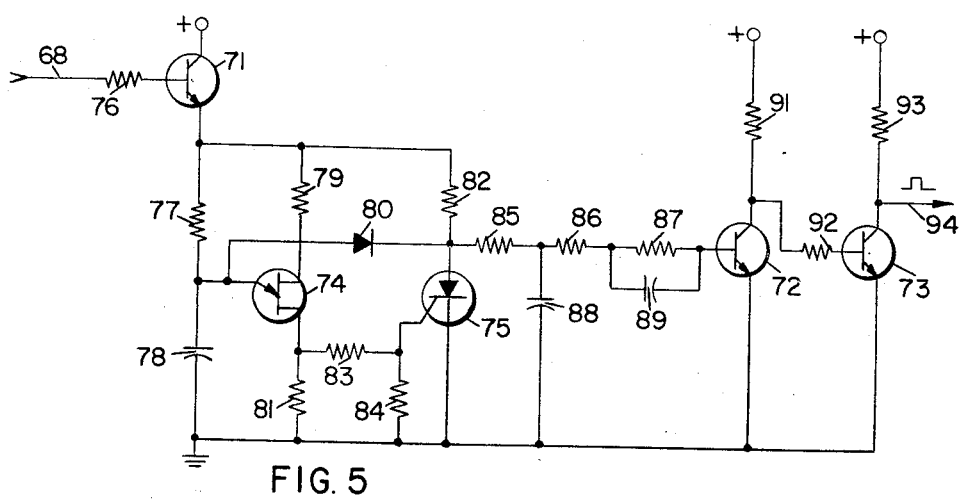
Figure 2:
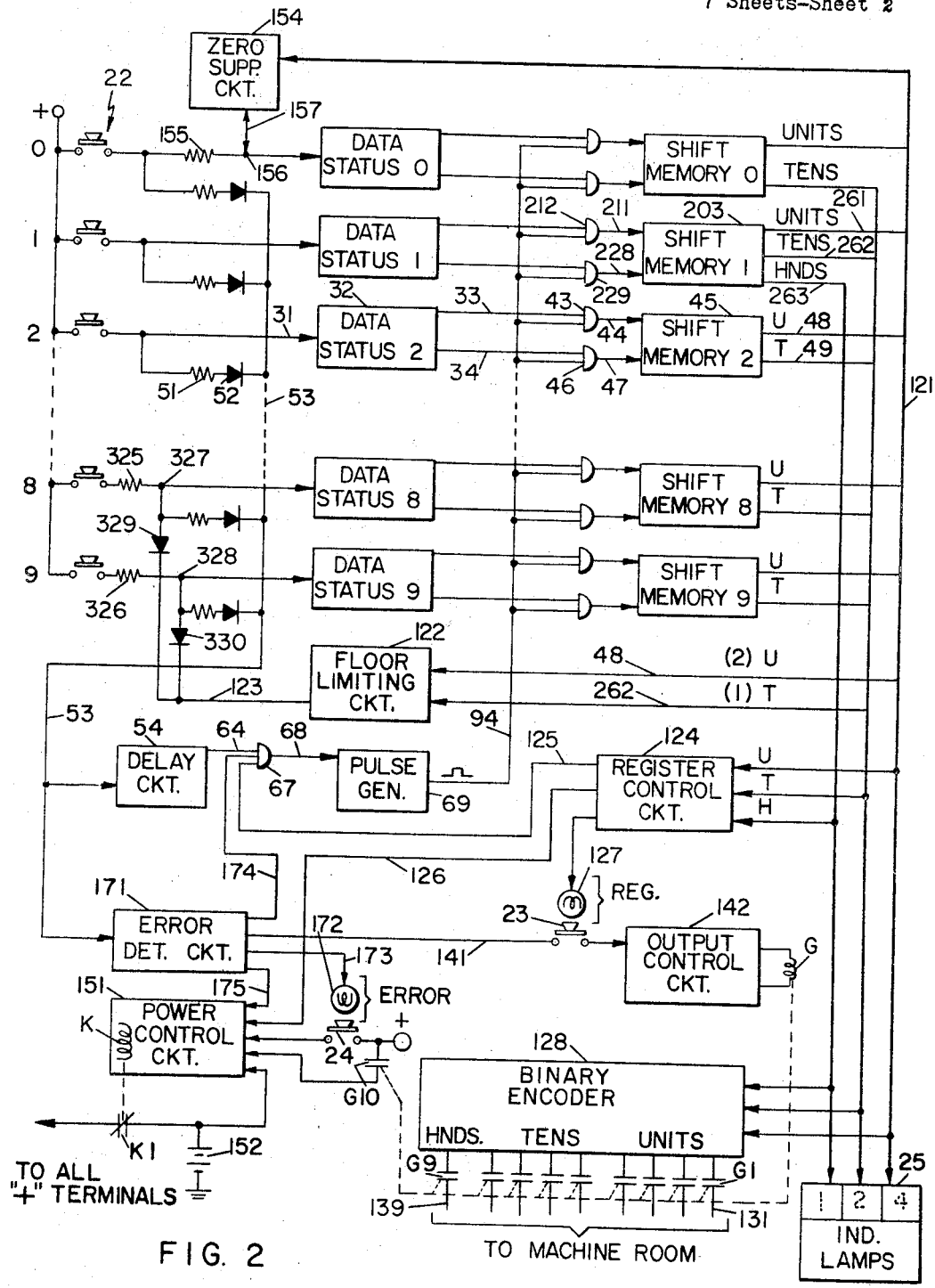
Figure 6:
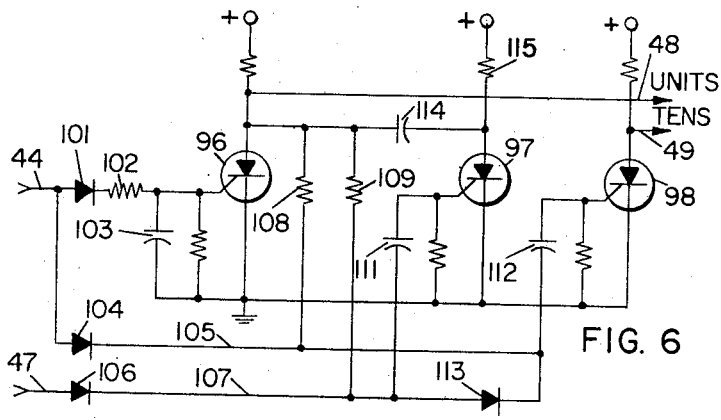
Figure 11:
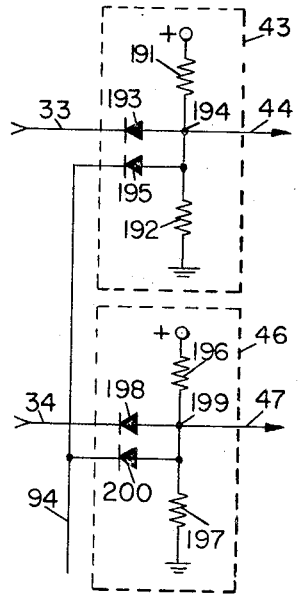
Figure 7:
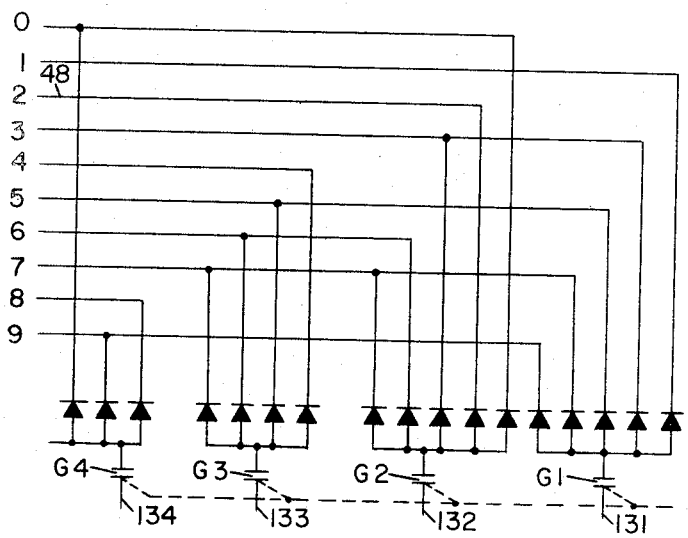
Figure 8:
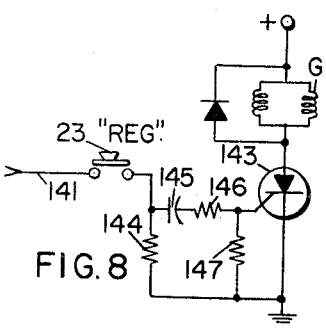
Figure 14:
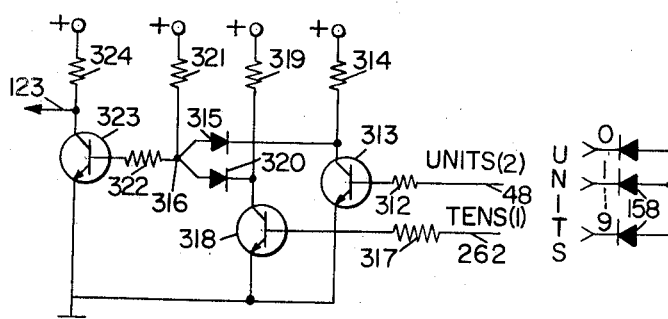
Figure 9:
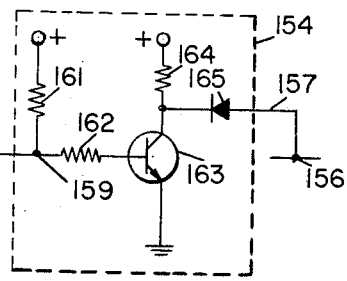
Figure 12A:
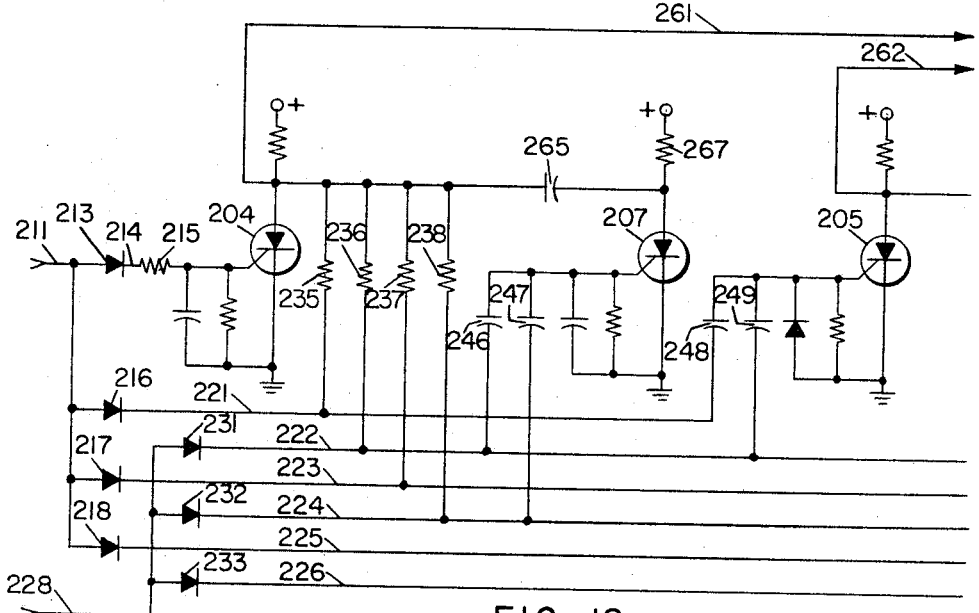
Figure 12B:
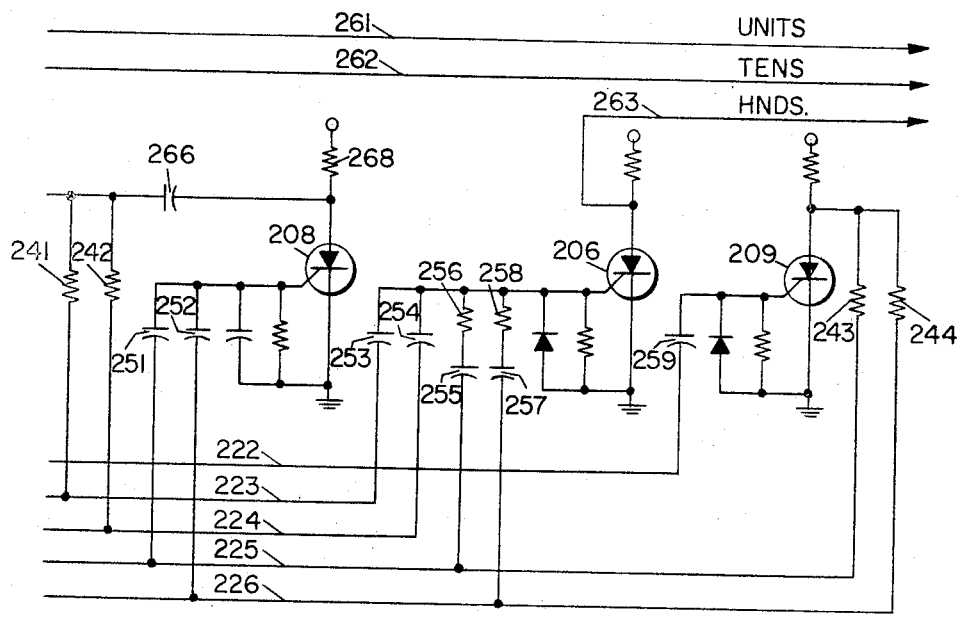
Figure 13:
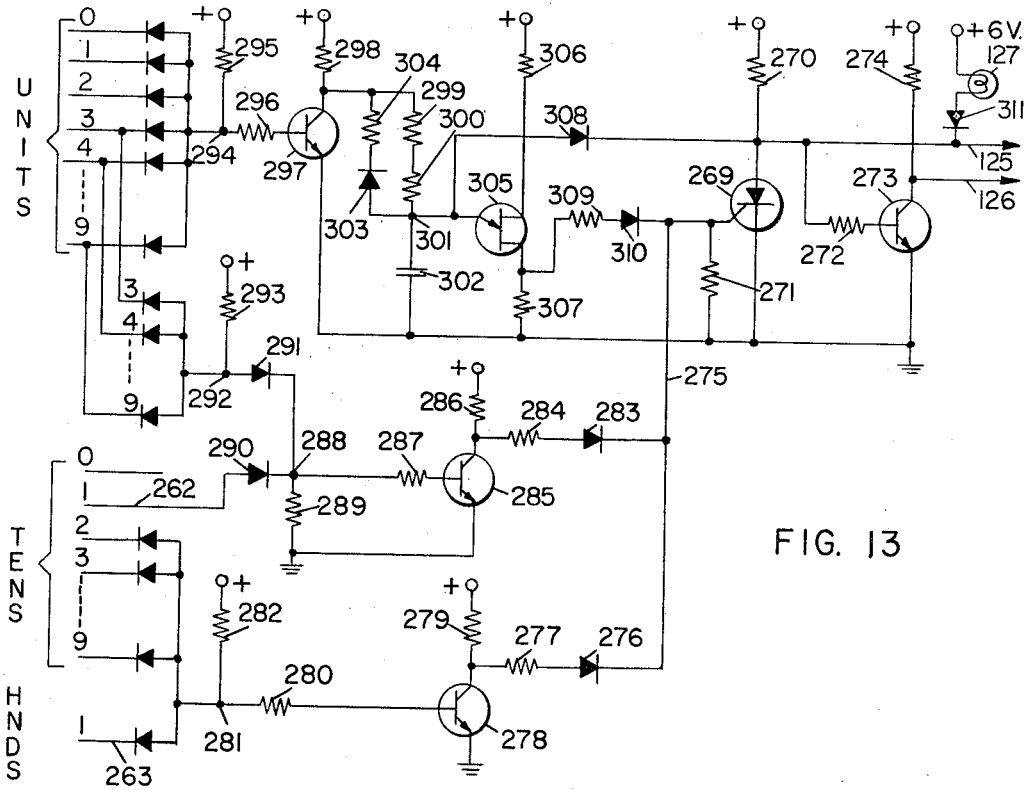
Figure 17:
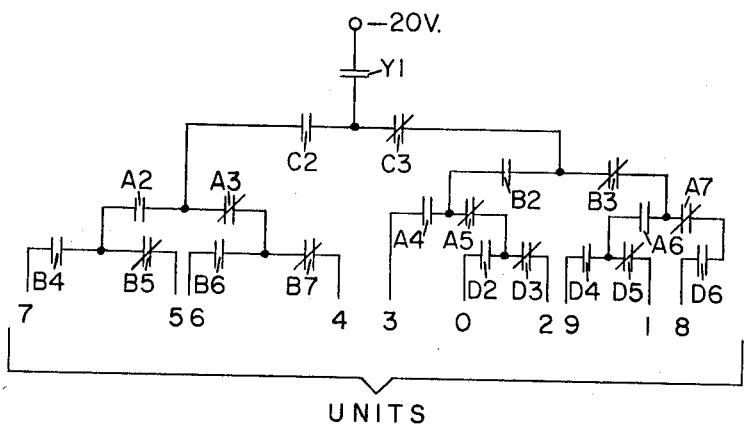
Figure 15:
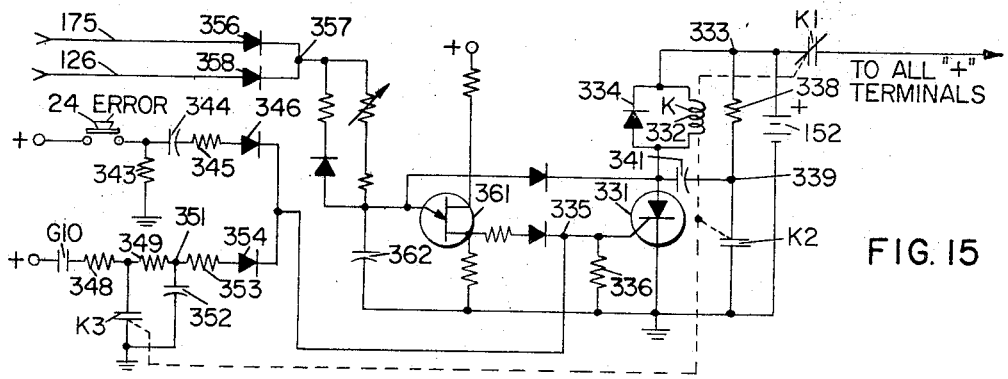
Figure 16:
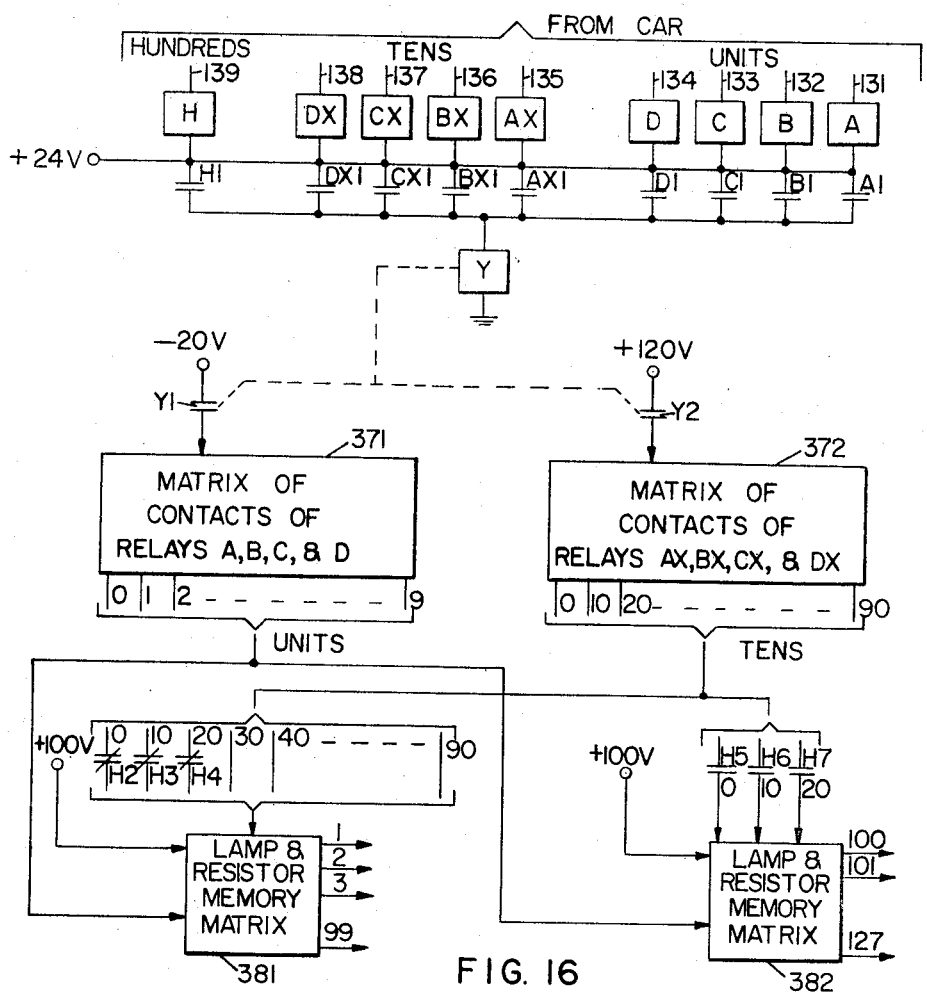
Figure 18:
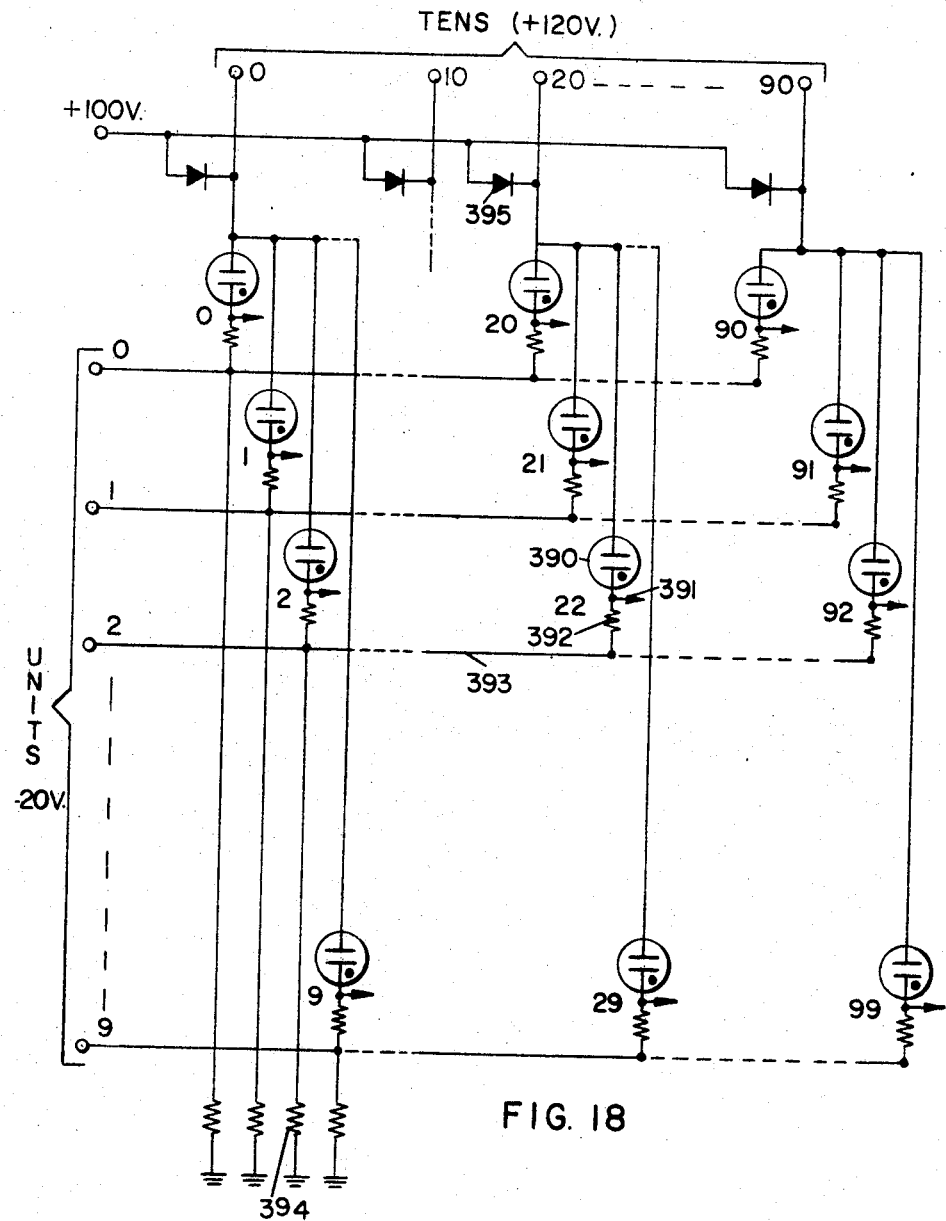

For a clearer understanding of the invention, reference may be made to the following detailed description and the accompanying drawing, in which:

FIGURE 1 is a schematic diagram of an elevator system including a control panel mounted in the car;
FIGURE 2 is a schematic diagram, largely in block form, of the equipment located in the car;
FIGURE 3 is a schematic diagram of a typical data status circuit;
FIGURE 4 is a schematic diagram of a delay circuit;
FIGURE 5 is a schematic diagram of the pulse generator circuit;
FIGURE 6 is a schematic diagram of one of the two place shift memory circuits;
FIGURE 7 is a schematic diagram of the units place portion of the binary encoder;
FIGURE 8 is a schematic diagram of the output control circuit;
FIGURE 9 is a schematic diagram of the zero suppression circuit;
FIGURE 10 is a schematic diagram of the error detection circuit;
FIGURE 11 is a schematic diagram of two of the "AND" gates;
FIGURE 12 (FIGURES 12a and 12b, taken together) is a schematic diagram of the three place shift memory circuit;
FIGURE 13 is a schematic diagram of the register control circuit;
FIGURE 14 is a schematic diagram of the floor limiting circuit;
FIGURE 15 is a schematic diagram of the power control circuit;
FIGURE 16 is a schematic diagram, largely in block form, of the equipment located in the machine room;
FIGURE 17 is a schematic diagram of the units place decoding matrix; and
FIGURE 18 is a schematic diagram of a memory matrix.

Referring first to FIGURE 1, there is shown schematically a fragment of an elevator car 11 supported by a hoist rope 12 which in turn is supported and driven by conventional apparatus shown schematically by the rectangle 13. The apparatus 13 includes a sheave 14 and the other equipment required to raise the car 11, to lower the car 11 and to stop the car 11 at selected floor landings. A traveling cable 15 interconnects the car 11 and the apparatus 13 and includes the conductors necessary for lighting, power and control circuits, some of which will be more fully described subsequently.

A panel 21 is mounted within the elevator car 11, preferably near the entrance so as to be readily accessible to the passengers as they enter. The panel includes ten floor buttons designated generally by the reference character 22, marked with the digits zero to nine inclusive as shown. The floor buttons may be either push buttons or touch buttons, or, for that matter, may be levers or any other devices capable of responding to actuation by a passenger. To the right of these buttons is a "Register" button 23, marked "R," and an "Error" button 24, marked "E." Each of the latter two buttons preferably includes a translucent surface covering a lamp which can be illuminated. Preferably each of the twelve buttons actuates a momentary contact switch which reverts to its former condition as soon as the passenger's finger is removed. Above the buttons is a three place digital display 25, preferably one which is capable of projecting any one of the ten digits on a screen in each of the three places corresponding to hundreds, tens and units respectively.

If a passenger wishes to go to the one hundred and twenty-fourth floor, for example, he first actuates the buttons 1, 2 and 4 sequentially in that order. As soon as the "1" button is actuated, the digit 1 appears in the units place of the display. Actuation of the 2 button shifts the 1 to the tens place and places a 2 in the units place. Actuation of the 4 button shifts the 1 to the hundreds place, the 2 to the tens place, puts a 4 in the units place, and illuminates the "Register" button. The passenger can check, by means of the display, whether he has actuated the floor buttons correctly. If not, he may actuate the "Error" button which immediately cancels the erroneous call, extinguishes the display, and resets the equipment, enabling it to accept a new call. If the display indicates the correct floor, the passenger registers his call by actuating the "Register" button, which transmits his call to the machine room and extinguishes all lamps on the panel.

As another example, assume that the passenger wishes to go to the twelfth floor. After actuating the 1 and the 2, the display will show the number 12. Although the "Register" lamp is not illuminated, the passenger can register his call right away by actuating the "Register" button, which will also extinguish the display. If the passenger neglects to actuate the "Register" button, then, after a predetermined time, preferably five seconds or so, the "Register" lamp will be illuminated. Further actuation of floor buttons has no effect after the "Register" lamp is lighted, although the call may still be cancelled by actuating the "Error" button or registered by actuating the "Register" button. However, if the passenger fails to actuate either of these buttons within a further predetermined time, the call will be cancelled automatically and all lamps extinguished.

It is to be noted that the above description of the operation has spoken of the sequential actuation of the floor buttons, and this is important. If two floor buttons are actuated simultaneously, the equipment will not accept either digit, and the "Error" lamp will be illuminated. The passenger can reset the apparatus right way by actuating the "Error" button, but if he does not, it will reset itself automatically after the expiration of another predetermined time, preferably on the order of a few seconds.

Having considered the function of the apparatus briefly from the passenger's point of view, we can now study the apparatus in more detail.

Referring now to FIGURE 2, each of the floor buttons 22 is arranged to close the contacts of a switch when actuated and to open the switch when released. One terminal of each of the switches is connected to a source of positive unidirectional voltage such as a twenty-four volt supply, while the other terminal of each switch is connected, either directly or through a small resistor, to the input of a data status circuit associated therewith, as well as to other apparatus. There are ten identical data status circuits, one for each of the switches, and ten shift memory circuits, nine of which are identical, two place circuits, one of which is associated with each of the buttons 0, 2, 3, 4, 5, 6, 7, 8 and 9, and the tenth of which is a three place circuit associated with the "1" floor button.

The apparatus can best be understood by considering an example. Assume that the passenger wishes to go to the twentieth floor. He first depresses the "2" floor button which applies a positive voltage through the conductor 31 to the data status circuit 32. This circuit has a pair of output conductors, one of which, the conductor 33, always bears a potential substantially the same as that of the input conductor while the other, the conductor 34, always has a potential the opposite of that of the input conductor 31. For present purposes, the conductors are considered capable of assuming only one of two potentials, either "high," that is, within a few volts of the supply voltage, or "low," that is, ground potential or a few volts above. One suitable circuit for this purpose is shown in FIGURE 3.

DATA STATUS CIRCUIT

As shown in FIGURE 3, the conductor 31 is connected through a resistor 35 to the base of a transistor 36, the emitter of which is grounded and the collector of which is connected to the output conductor 34 and also connected through a resistor 37 to the positive voltage source. The collector is also connected through a resistor 38 to the base of a transistor 39 the emitter of which is grounded and the collector of which is connected to the output conductor 33 and also connected through a resistor 40 to the positive voltage source. It is apparent that when the input conductor is at low voltage, the transistor 36 is nonconductive, the output conductor 34 is at high potential, the transistor 39 is conductive and the output conductor 33 is at low potential. It is apparent that when the conductor 31 is at high potential, the conductivity of the transistors 36 and 39 is reversed, the conductor 33 is at high potential and the conductor 34 is at low potential.

Returning to FIGURE 2, the conductor 33 is connected to one input terminal of an AND gate 43, the output of which is connected by a conductor 44 to an input of the two place shift memory circuit 45. Similarly, the conductor 34 is connected to one input terminal of an AND gate 46 the output of which is connected by a conductor 47 to another input of the two place shift memory circuit 45. This circuit, when suitably triggered, can store an indication in its "units" place. When further triggered, the indication can be shifted to its "tens" place and an indication may or may not remain in the "units" place, depending upon the nature of the trigger. An output conductor 48 normally bears a high potential but bears a low potential when an indication is stored in the "units" place. Similarly, an output conductor 49 also normally bears a high potential but bears a low potential when an indication is stored in the "tens" place. Before considering the details of this circuit, the generation of the trigger will be considered.

Actuation of the "2" floor button not only places a high potential on the conductor 31, as previously discussed, but also, through a resistor 51 and a diode 52, places a high potential on a conductor 53. Actually, the actuation of any floor button places a high potential on the conductor 53, by virtue of a corresponding resistor and diode, as is shown in FIGURE 2. The conductor 53 is connected to the input of a delay circuit 54, which may be any of various kinds and is for the purpose of delaying the positive going pulse a few milliseconds until the transistors 36 and 39 in the data status circuit 32 have had their conductivity shifted. One suitable form of delay circuit is shown in FIGURE 4.

DELAY CIRCUIT

Referring now to FIGURE 4, the conductor 53 is connected through a resistor 56 to the base of a transistor 57 the emitter of which is grounded and the collector of which is connected through a resistor 58 to a source of positive potential. The collector is also connected through serially connected resistors 59 and 61 to the base of a transistor 62 the emitter of which is grounded and the collector of which is connected through a resistor 63 to a source of positive potential. The collector is also connected to the output conductor 64. A capacitor 65 is connected between ground and the junction of the resistors 59 and 61.

When the potential of the conductor 53 is low, the transistor 57 is nonconductive, the transistor 62 is conductive, and the potential of the output conductor 64 is low. Since the transistor 57 is nonconductive, the potential of its collector is high and the capacitor 65 becomes charged. When a high voltage appears on the conductor 53, the transistor 57 becomes conductive and the potential of its collector falls. The capacitor 65 starts to discharge and after a short time, preferably a few milliseconds, it discharges sufficiently to cut off the transistor 62 whereupon the potential of the output conductor 64 becomes high.

Returning to FIGURE 2, the conductor 64 is connected to one input of an AND circuit 67. This circuit has two additional inputs but for the present it will be assumed that both of them are at a high positive potential. The output of the AND circuit 67 is connected through a conductor 68 to a pulse generating circuit 69. This circuit may be any of several kinds, it only being necessary that it generate a positive output pulse of a few milliseconds duration in response to the application of a positive voltage to the input. One satisfactory circuit is shown in FIGURE 5.

PULSE GENERATOR

Referring now to FIGURE 5, the pulse generator is seen to consist of three NPN transistors 71, 72 and 73, a unijunction transistor (UJT) 74, a silicon controlled rectifier (SCR) 75 and their associated circuits. The input conductor 68 is connected through a resistor 76 to the base of the transistor 71, the collector of which is connected to the positive voltage source and the emitter of which is connected to one terminal of the resistor 77, the other terminal of which is connected to one plate of a capacitor 78, the other plate of which is grounded. The emitter is also connected through a resistor 79 to the second base of the UJT 74 the first base of which is connected through a resistor 81 to ground. The emitter of the UJT is connected to the junction of the resistor 77 with the capacitor 78 and is also connected to the anode of a diode 80 the cathode of which is connected to the anode of the SCR 75. The emitter of the transistor 71 is also connected through a resistor 82 to the anode of the STR 75, the cathode of which is grounded. Resistors 83 and 84 are serially connected across the resistor 81 and their junction is connected to the gate electrode of the SCR 75 as shown. The anode of the SCR 75 is connected through resistors 85, 86 and 87 to the base of the transistor 72. A capacitor 88 is connected between ground and the junction of resistors 85 and 86 and a capacitor 89 is shunted across the resistor 87. The emitter of the transistor 72 is grounded while the collector is connected through a resistor 91 to the positive voltage source. The collector is also connected through a resistor 92 to the base of the transistor 73, the emitter of which is grounded and the collector of which is connected through a resistor 93 to the positive voltage source. An output conductor 94 is also connected to the collector of the transistor 73.

When the input conductor 68 is at low potential, the transistor 71 is nonconductive and its emitter is a low potential. Accordingly, the UJT 74, the SCR 75 and the transistor 72 are all nonconductive. The transistor 73 is conductive and accordingly the output conductor 94 is at low potential. If the input conductor 68 now has a high voltage applied thereto, the transistor 71 becomes conductive and its emitter also assumes a high potential. The high potential is transmitted through the resistors 82, 85, 86 and 87 to the base of transistor 72 which is thereby rendered conductive. The resulting low potential of the collector thereof is transmitted to the base of the transistor 73 thereby cutting it off and raising the potential of the output conductor 94. At the same time, the capacitor 78 starts to charge through the resistor 77 and after a predetermined interval, preferably a few milliseconds, the potential of the emitter of the UJT 74 rises sufficiently to render it conductive. The voltage drop across the resistor 81 causes a positive potential to be applied to the gate electrode of the SCR 75 thereby rendering it conductive. The resulting low potential of the anode thereof is passed through the resistors 85, 86 and 87 to the base of the transistor 72 thereby cutting it off. The resulting high potential of the collector is passed through the resistor 92 to the base of the transistor 73 thereby rendering it conductive and reducing the potential of the output conductor 94. In this fashion a short voltage pulse is generated. Its duration, preferably a few milliseconds, is determined by the magnitude of the resistor 77 and the capacitor 78.

The conduction of the SCR 75 also provides a discharge path for the capacitor 78 through the diode 80, and the UJT 74 becomes nonconductive. When the potential of the conductor 68 falls, as by the passenger releasing the floor button, the transistor 71 is rendered nonconductive, thereby cutting off the anode supply for the SCR 75 and rendering it nonconductive.

The network comprising resistors 85, 86 and 87 and capacitors 88 and 89 is inserted between the SCR 75 and the transistors 72 to improve the operation. It has been found that, in the absence of this network, erroneous operation may be caused by contact bounce when the buttons 22 are actuated. The low pass filter comprising resistors 85 and 86 and capacitor 87 prevents spurious transient voltage spikes from rendering transistor 72 conductive erroneously. The resistor 87 and capacitor 89 have been found to improve the waveform of the output pulse.

Referring again to FIGURE 2, the output conductor 94 from the pulse generator 69 is connected to one input terminal of each of the AND gates 43 and 46 (and also to one input terminal of each of the other corresponding AND gates). Thus, a very short time after the No. 2 button is actuated, a pulse is impressed upon the shift memory circuit 45 over the conductor 44. The details of this circuit can now be considered.

TWO PLACE SHIFT MEMORY CIRCUIT

Referring now to FIGURE 6, the two place shift memory circuit includes three SCR's 96, 97 and 98. The anode of each is connected through its own resistor to a source of positive voltage and the cathode of each is grounded. The gate electrode of each is connected through its own resistor to ground. The input conductor 44 is connected through a diode 101 and a resistor 102 to the gate circuit of the SCR 96. A capacitor 103 is connected between the gate electrode and the ground. The input conductor 44 is also connected through a diode 104 to a conductor 105. The input conductor 47 is connected through a diode 106 to a conductor 107. The anode of the SCR 96 is connected through a resistor 108 to the conductor 105 and is also connected through a resistor 109 to the conductor 107. A capacitor 111 interconnects the gate electrode of the SCR 97 with the conductor 107 while a capacitor 112 interconnects the gate electrode of the SCR 98 with the conductor 105. A diode 113 is connected as shown between the conductor 107 and the conductor 105. A capacitor 114 is connected between the anodes of SCR's 96 and 97.

Assuming that both input conductors 44 and 47 are at low potential, it will be apparent from the showing of FIGURE 6 and the above description that the SCR's 96, 97 and 98 will initially be nonconductive. The resulting high potential on the anode of the SCR 96 is passed through the resistors 108 and 109 to the conductors 105 and 107, thereby back biasing the diodes 104 and 106 so that positive pulses cannot pass through them. Capacitor 114 initially has substantially no charge because the anodes of SCR's 96 and 97 are at substantially the same high potential.

Assuming now that a positive potential is impressed upon the input conductor 44, this potential passes through the diode 101 and the resistor 102 to the gate electrode of the SCR 96, rendering it conductive. The SCR's 97 and 98 remain nonconductive, at this time. The low resulting potential on the anode of the SCR 96 is applied to the output conductor 48 and represents the storage of the digit 2 in the units' place. This low potential also causes the capacitor 114 to be charged through the resistor 115 (in the anode circuit of the SCR 97) and through the SCR 96.

Before considering the effect of recording a "2" in the units' place, let us see how a digit is shifted to the "tens" place. Assuming that the conductor 48 is at low potential, and that the floor button which caused all this has been released, and further assuming that any one of the remaining buttons is next actuated, it is apparent from FIGURE 2 that another pulse will be placed on the conductor 94. The release of the "2" button caused the potential of the conductor 34 to revert to its former high potential condition. Therefore, the AND circuit 46 is enabled and a short positive pulse is applied to the conductor 47. This pulse can pass through the diode 106 because the conductivity of the SCR 96 has removed the former back bias which had been applied through the resistor 109. The pulse passes through the capacitor 111 to the gate electrode of the SCR 97 thereby rendering it conductive. The sudden lowering of its anode potential is passed through the capacitor 114 to the anode of the SCR 96 thereby rendering it nonconductive. This removes the "2" from the units' place. At the same time, the pulse on conductor 47 passes through the diode 106, conductor 107, the diode 113 and the capacitor 112 to the gate electrode of SCR 98, thereby rendering it conductive. The resulting low anode potential is applied to the output conductor 49 and constitutes a storage of the digit "2" in the tens place. It is to be noted that the conductivity of the SCR 97 establishes a discharge path for the capacitor 114 and that such discharge sustains the conductivity of SCR 97 temporarily. When the capacitor 114 discharges sufficiently, conductivity ceases because the value of the resistor 115 is selected to be large enough to prevent the passage of sufficient current to sustain the conduction of SCR 97.

It is also possible to store a "2" in both the units and the tens place. Assume that the digit "2" has been stored in the units' place as before. If the passenger now actuates the "2" button again, the output conductor 33 of the data status unit 32 will become conductive and the pulse from the generator 69 will pass through the AND circuit 43 to the conductor 44. Then from there, it will pass through the diode 104 and the capacitor 112 to the gate circuit of the SCR 98 thereby rendering it conductive without, however, rendering the SCR 97 conductive. Accordingly, a "2" is stored in both the units and the tens place.

Referring again to FIGURE 2, let us return to our illustrative example wherein the passenger wished to go to the 20th floor and had already pushed the "2" button thereby placing a low potential on the output conductor 48. This conductor becomes part of a units cable 121 by which the stored indication is transmitted to other components. The low potential is transmitted to a floor limiting circuit 122, the details of which will be discussed subsequently, it being sufficient to note for present purposes that the output conductor 123 thereof normally bears a high potential. The low potential of the conductor 48 is also passed to a register control circuit 124, the details of which will also be discussed subsequently. It is sufficient for the present purposes to note that one output conductor 125 thereof normally bears a high potential, that another output conductor 126 normally bears a low potential and that the register lamp 127 is normally extinguished.

The low potential of conductor 48 is also passed to the display unit 25 where it causes the digit "2" to be projected on to the screen in the units' place.

The low potential of the conductor 48 is also passed to a binary encoding unit or encoder 128 where the decimal digit 2 is encoded in four-wire parallel binary form to the binary No. 0010. One suitable circuit for performing this function is illustrated in FIGURE 7.

BINARY ENCODER

Referring now to FIGURE 7, the units' place output conductors of each of the shift memory circuits, representing the digits 0 to 9 inclusive, are connected through a diode network as shown to four normally open relay contacts G1, G2, G3 and G4 of an output control relay "G" which contacts are in turn connected to four output conductors 131 to 134 inclusive which conductors are connected through the traveling cable and via the hoistway to the machine room. The four conductors represent the four places of binary numbers representing the digits 0 to 9 inclusive. The contact G1 and the conductor 131 represent the least significant place while the contact G4 and the conductor 134 represent the most significant place. Without going into detail, it is believed that it can be seen that the coding is accomplished. For example, the conductor 48, representing the digit "2," is connected through its diode only to the contact G2 so that, when all of the G relay contacts are closed, there will be a low potential on conductor 132 only. This represents the binary No. 0010. As another example the conductor for the decimal digit "7" is connected through diodes to the relay contacts G3, G2 and G1, thereby representing the binary No. 0111. This is all straightforward, the only change being that the digit "0" in this case is transmitted as if it were the binary ten, that is, 1010.

Another network, identical to the one above described, is provided within the encoder for the tens place digits. The outputs pass through contacts G5 through G8 and through conductors 135 through 138 to the machine room. The hundreds place requires no coding and only being necessary to connect the hundreds conductor to an output contact G9 and an output conductor 139.

It is to be noted that the selected floor landing number is temporarily stored, in the first instance, by the shift memory circuits, in decimal form as received but that it is continuously and immediately converted to binary form in which form it is available for transmission to the machine room upon energization of the relay G.

Returning to our example in which the passenger wished to go to the twentieth floor, we have seen what happens when the "2" button is actuated. Briefly, a low voltage is placed on conductor 48, the digit "2" is displayed in the panel, a low voltage has been applied to the binary encoder, the register control circuit and the floor limiting circuit. Consider what happens when the passenger next actuates the "0" button. The data status circuit and the shift memory circuit for the "0" place are identical to those for the "2" place and accordingly when the 0 button is actuated, a 0 is illuminated in the display 25 and the signals are passed to the binary encoder and the register control circuit but not to the floor limiting circuit. Also, the digit "2" is shifted from the units place and is illuminated in the display 25.

The passenger may now register his call by actuating the register button 23. Assuming that the button is connected through a conductor 141 to a positive source, actuation thereof will place this positive voltage on the output control circuit 142 which acts to energize the relay "G." A suitable output control circuit is shown in FIGURE 8.

OUTPUT CONTROL CIRCUIT

Referring to FIGURE 8, there is shown an SCR 143, the cathode of which is grounded and the anode of which is connected through the operating winding of the relay "G" to a source of positive potential. The relay "G" may be a single relay or may be several in parallel as necessary to obtain the required number of contacts. The register button 23 is connected through a resistor 144 to ground and is also connected through a capacitor 145 and a resistor 146 to the gate electrode of the SCR 143 which is also connected to ground through a resistor 147. Assuming that the conductor 141 has a high potential thereon, which is normally the case, actuation of button 23 places a positive pulse on the gate electrode of the SCR 143 rendering it conductive and thereby energizing the relay "G." The relay will, of course, remain actuated even when button 23 is released.

Referring back to FIGURE 2, energization of the relay "G" actuates contacts G1 to G10 inclusive. The first nine contacts complete a circuit representing the twentieth floor to the machine room. The tenth contact places a positive voltage on the input to a power control circuit 151. This circuit will be considered in detail subsequently. For the present it is sufficient to note that its purpose is to reset the apparatus to zero so that it can accept another call. Briefly, a primary source of power such as a battery, is connected to the power control circuit and is also connected through normally closed contact K1 of a relay K to all of the positive terminals so far referred to in FIGURES 1 through 8. Closure of the contact G10 and application of a positive voltage to the circuit 151 starts a time delay circuit in operation so that after a predetermined time the relay "K" is operated, thereby opening the contacts K1 and removing the positive voltage from all of the apparatus, thereby resetting everything to zero. As will be more fully explained, this circuit may be actuated by means other than the relay contact G10.

ZERO SUPPRESSION CIRCUIT

Near the top of FIGURE 2 there is shown a zero suppression circuit 154, the purpose of which is to prevent the illumination of digit 0 as the first digit in any floor indications displayed. Neither this circuit nor its functions are essential but it is preferred to include them because it is disconcerting to see a meaningless cipher displayed. The "0" button is connected through a resistor 155 to a junction 156 which junction is connected both to the corresponding data status circuit and to the zero suppression circuit 154. As best shown in FIGURE 9, the units place output conductors of each of the shift memory circuits for the digits 0 to 9 inclusive are connected through their individual diodes 158 to a junction 159 which junction is connected through a resistor 161 to a source of positive potential and through a resistor 162 to the base of a transistor 163. The emitter of the transistor 163 is grounded while the collector is connected through a resistor 164 to a source of positive voltage. The collector is also connected to the cathode of a diode 165, the anode of which is connected by the conductor 157 to the previously mentioned junction 156.

Initially, after the apparatus has been reset and before any floor buttons have been actuated, all of the output conductors of all of the shift memory circuits are at high potential and accordingly the diodes 158 are back biased and, therefore, the junction 159 is at a high potential, the transistor 163 is conductive, and its collector is at low potential. Accordingly, the junction 156 is at substantially ground potential so that if the "0" floor button be actuated, all of the voltage drop will appear across resistor 155 (FIGURE 2), current will flow through the transistor 163 to ground and no positive potential will be applied to the data status circuit and, therefore, the "0" will not be illuminated in the display. However, once any one of the digits 1 to 9 inclusive has been stored in the units place of its shift memory circuit, one of the diodes 158 will be rendered conductive and thereafter the junction 159 will be at low potential, the transistor 163 will be nonconductive and the collector will be at a high potential thereby back biasing the diode 165 so that any subsequent actuation of the "0" button will cause high potential to be passed to the data status circuit which will operate in the usual manner.

ERROR DETECTING CIRCUIT

Referring again to FIGURE 2, an error detecting circuit 171 is connected to the conductor 53. The purpose of this circuit is to prevent erroneous operation in case the passenger should actuate two floor buttons simultaneously. If this should happen, an error lamp 172 is illuminated by means of an output conductor 173. Additionally, the output conductor 141 which normally has a high potential will have its potential reduced so that the register control button 23 cannot actuate the output control circuit. An output conductor 174 normally has a high potential but upon the occurrence of an error, the potential is low thereby preventing the pulse generator 69 from being triggered. Additionally, upon the occurrence of an error, an output conductor 175 has a high potential impressed thereon. A suitable circuit for performing these functions is shown in FIGURE 10.

Referring now to FIGURE 10, the conductor 53 is connected to one terminal of a resistor 177, the other terminal of which is grounded. A voltage divider comprising serially-connected resistors 178 and 179 is connected across the resistor 177 and the junction thereof is connected to the gate electrodes of an SCR 181. The cathode of the SCR 181 is grounded while the anode is connected through a resistor 182 to a source of positive potential. A lamp 172 is connected in series with the resistor 183, the combination being connected across the resistor 182. The anode of the SCR 181 is connected to the output conductors 141 and 174 and is also connected through resistor 184 to the base of transistor 185, the emitter of which is grounded and the collector of which is connected through a resistor 186 to a source of positive potential. The collector is also connected to the output conductor 175.

When no floor buttons are actuated, the conductor 53 is at low potential as is the gate electrode of the SCR 181 and, providing the apparatus has been reset, the SCR 181 is nonconductive. Such nonconductivity places a high potential on the output conductors 141 and 174. It also renders the transistor 185 conductive thereby placing a low potential on the output conductor 175. Since there is no voltage drop across the resistor 182, the lamp 172 remains extinguished. If one of the floor buttons be actuated, a potential will appear on the conductor 53 and a current will flow through the resistor 177 thereby creating a voltage drop. However, the values of resistors 177, 178 and 179 are selected so that the operation of a single floor button will not generate sufficient voltage at the gate electrode of the SCR 181 to cause it to become conductive. However, actuation of two floor buttons simultaneously will significantly increase the voltage placed upon the gate electrode and will cause the SCR 181 to conduct. When it does, the output conductors 141 and 174 will have a low potential and the output conductor 175 will have a high potential. The low potential on the conductor 141 prevents the register button 23 from actuating the output control circuit. The low potential on conductor 174 disables the AND gate 67 thereby preventing the pulse generator 69 from being triggered. The voltage drop across the resistor 182 illuminates the lamp 172 giving a visual indication that an error has been made. The high potential on conductor 175 starts the actuation of the power control circuit 151 as will be more fully explained.

"AND" GATES

Although it has been stated that, in general, the various conductors have either a high or a low voltage impressed upon them, and that the high voltage is near 24 volts, there is an important exception to this which exception occurs in the output of one of the AND gates which is connected to the three place memory circuit associated with the digit "1." However, the AND gates associated with all of the shift memory circuits may be the same and accordingly, the gates 43 and 46 are shown in FIGURE 11.

Referring now to FIGURE 11, a voltage divider comprising serially connected resistors 191 and 192 is connected between the source of positive voltage and ground. The conductor 33 from the data status unit 32 is connected to the cathode of a diode 193, the anode of which is connected to the junction 194 of these resistors. The conductor 94 from the pulse generator circuit 69 is connected to the cathode of a diode 195, the anode of which is also connected to the junction 194. The output conductor 44 is also connected to this junction. The resistors 191 and 192 are preferably of approximately the same value and may be, for example, 12,000 ohms. Assuming the supply voltage is 24 volts, if either of the conductors 33 or 94 is at a low potential, then the junction 194 will be at a similar low potential. However, if both of the conductors 33 and 94 are at a high potential, then the junction 194 will be at approximately 12 volts, which, for the purpose of the following logic circuits, may be assumed to be a "high" voltage.

The AND gate 46 is of a very similar construction, comprising serially connected resistors 196 and 197 connected from the positive voltage source to ground. The conductor 34 from the data status unit 32 is connected to the cathode of a diode 198, the anode of which is connected to the junction 199 of these resistors. The conductor 94 from the pulse generator 69 is connected to the cathode of a diode 200, the anode of which is also connected to the junction 199 as is the output conductor 47. However, in this case, it is preferred to make the resistor 196 approximately twice that of the resistor 197, suitable values being 12,000 ohms and 6,200 ohms respectively. Then, when both of the conductors 34 and 94 are at a high potential, the junction 199 and the output conductor 47 will be at a potential of approximately 8 volts. As will become apparent subsequently, it is important that this voltage be something less than 12 volts.

THREE PLACE SHIFT MEMORY CIRCUIT

As previously mentioned, the three place shift memory circuit, shown at 203 in FIGURE 2, is different from the unit 45 shown in detail in FIGURE 6 in that it contains a hundreds place, as well as a tens and a unit place, so that more than 100 floors can be accommodated.

Referring now to FIGURE 12, SCR's 204, 205 and 206 are provided for the units, tens and hundreds places, respectively. SCR's 207 and 208 are provided for turning off SCR's 204 and 205 respectively. SCR 209 is an auxiliary SCR.

The output conductor 211 from the AND gate 212, which is preferably identical to the AND gate 43 described in connection with FIGURE 11, is connected through diode 213 to a conductor 214 which in turn is connected through a resistor 215 to the gate electrode of the SCR 204. The conductor 211 is also connected through diodes 216, 217 and 218 to conductors 221, 223, and 225, respectively. The output conductor 228 from the AND gate 229, which preferably is identical to the AND gate 46 described in connection with FIGURE 11, is connected through diodes 231, 232 and 233 to conductors 222, 224 and 226 respectively.

Resistors 235, 236, 237 and 238 are connected between conductors 221, 222, 223 and 224 respectively and the anode of the SCR 204. Resistors 241 and 242 are connected between conductors 223 and 224 respectively and the anode of the SCR 205. Resistors 243 and 244 are connected between the conductors 225 and 226 respectively and the anode of the SCR 209. Capacitors 246 and 247 are connected between conductors 222 and 224 respectively and the gate electrode of the SCR 207. Capacitors 248 and 249 are connected between the conductors 221 and 222 respectively and the gate electrode of the SCR 205. Capacitors 251 and 252 are connected between the conductors 225 and 226 respectively and the gate electrode of the SCR 208.

Capacitors 253 and 254 are connected between conductors 223 and 224 respectively and the gate electrode of the SCR 206. A capacitor 255 and a resistor 256 are serially connected in that order, between the conductor 225 and the gate electrode of the SCR 206. A capacitor 257 and a resistor 258 are serially connected in that order, between the conductor 226 and the gate electrode of the SCR 206. A capacitor 259 is connected between the conductor 222 and the gate electrode of the SCR 209.

The cathode of each of the SCR's 204 to 209, inclusive are grounded while the anodes of each are connected through their own individual resistors to a source of positive potential. The gate electrode of each of the SCR's 204, 207 and 208 are coupled to ground through a parallel combination of a resistor and capacitor for each. The gate electrodes of SCR's 205, 206 and 209 are each coupled to ground through their own parallel combination of a resistor and a diode. The units place output conductor 261 is connected to the anode of the SCR 204. The tens place output conductor 262 is connected to the anode of the SCR 205 while the hundreds place output conductor 263 is connected to the anode of the SCR 206.

Let us now consider the operation of this circuit. There will be an output in the hundreds place only if the passenger operates three buttons, the first of which is the digit 1. For convenience, the various combinations of digits can be considered to be 111, 11X, 1X1 and 1XX, where X represents any digit other than 1. The operation will be described for the combination 1X1.

Initially, all of the SCR's are nonconductive. The resistors 235 through 238 and 241 through 244, connect the cathodes of the diodes 216, 217, 218, 231, 232 and 233 to a source of high potential, thereby rendering these diodes nonconductive and blocking the passage of pulses to the lines 221 through 226.

When the passenger pushes the 1 button, a positive pulse will appear on the conductor 211 and will pass through the diode 213, the conductor 214, and the resistor 215 to the gate electrode of the SCR 204, thereby rendering it conductive. The potential of the anode will, therefore, be reduced to a low value which will be passed to the units place output conductor 261. The lines 221 and 222 are now open because the resistors 225 and 226 are now connected to a source of low potential. The lines 223 and 224 are blocked to any signal input pulse less than about 12 volts because resistors 241 and 242, each having one terminal connected to the high potential anode of the SCR 205, are connected through lines 223 and 224 so as to be in series with the resistors 237 and 238 respectively, which in turn are connected to the low potential of the anode of the now conductive SCR 204. This connection makes the potential of the lines 223 and 224 about half of the supply voltage, or about 12 volts, assuming that the resistors 225 through 228 and 241 through 244 all have approximately the same value. Lines 225 and 226 remain blocked as before.

Assume that the passenger next actuates a button X (other than 1). A pulse of about 8 volts will appear on the conductor 228 but it can pass only through the diode 231 to the line 222. From there it passes through the capacitor 246 to the gate electrode of the SCR 207 thereby rendering it conductive. The sudden drop in anode potential is passed through a capacitor 265 to the anode of the SCR 204, thereby rendering the latter SCR nonconductive. The pulse also passes through capacitor 249 to the gate electrode of the SCR 205 thereby rendering it conductive and placing a low potential on the tens place output conductor 262. The pulse also passes through the capacitor 259 to the gate electrode of the SCR 209 thereby rendering it conductive and unblocking lines 225 and 226. It will be noted that lines 221 through 224 have again been blocked by the nonconductivity of the SCR 204. The SCR 207 remains conductive only briefly because the value of the anode resistor 267 is selected to be high enough to prevent passage of sufficient current to sustain conductivity after capacitor 265 has discharged.

Assume now, that the passenger actuates the 1 button again. A positive pulse will appear on the conductor 211 and will pass through the diode 213 and its associated circuitry to the gate electrode of the SCR 204, thereby rendering it conductive and placing a low potential on the units place output conductor 261. The pulse will also pass through the diode 218 to the line 225 and from there through the capacitor 251 to the gate electrode of the SCR 208 thereby rendering it conductive. The sudden drop in anode potential is passed through a capacitor 266 to the anode of the SCR 205 thereby rendering the latter nonconductive. The SCR 208 soon reverts to nonconductivity because of the high value of the anode resistor 268. The pulse on line 225 also passes through the capacitor 255 and the resistor 256 to the gate electrode of the SCR 206 thereby rendering it conductive and placing a low potential on the hundreds place output conductor 263. The circuit 203 now has an output (low voltage) on the units place output conductor 261 and on the hundreds place output conductor 263, but no output (a high voltage) on the tens place output conductor 262.

The operation of the circuit for other digit combinations is quite similar and can be traced in a similar manner.

REGISTER CONTROL CIRCUIT

The purpose of the register control circuit, as briefly mentioned previously, is to generate an output, under certain conditions, which will (1) render further door button actuation ineffective, (2) start the operation of a timer in the power control circuit and (3) light a lamp indicating that these functions have been performed. All three of these functions are performed simultaneously when an output signal is generated.

The inputs to the register control circuit are taken from the output conductors of the various shift memory circuits. The register control circuit itself has an internal timer. Certain inputs cause an output to appear immediately while other inputs start the internal timer, causing an output to appear after a predetermined time, for example, five seconds or so. Which inputs cause an immediate output and which inputs cause a delayed output will vary with different numbers of floors served. In the present case, it will be assumed that 127 floors are served and the connections for this number of floors will be illustrated and explained.

With 127 floors, it is obvious that if a signal appears on the hundreds place conductor, the register control circuit should generate an output immediately. Also, if there is a signal in the tens place of any one of the shift memory circuits for the digits 2 to 9 inclusive, then there should be an immediate output from the register control circuit. This is because no digit higher than 1 can or should be shifted to the hundreds place and accordingly further digit button actuation should be rendered ineffective in order to prevent registration of calls for the non-existent floors 200 and above. Additionally, if there is a signal in the tens place of the shift memory circuit for the digit 1 (circuit 203) and at the same time there is a signal in the units place of any one of the shift memory circuits for the digits 3 to 9 inclusive (that is, if the unit 25 displays any number from 13 to 19 inclusive), then again the register control circuit should generate an output immediately in order to prevent erroneous registration of calls for any of the non existent floors 130 to 199. However, whenever there is a signal in the units place of any of the shift memory circuits, then the timer in the register control circuit should be started so that an output will appear a few seconds later. Let us now consider the details of the circuit.

Referring now to FIGURE 13, the presence or absence of an output is determined by the conduction or non-conduction of a silicon controlled rectifier (SCR) 269 the cathode of which is grounded and the anode of which is connected through a resistor 270 to the positive voltage source. The gate electrode is connected through a resistor 271 to ground. The anode of the SCR 269 is also connected to the output conductor 125 and in addition is connected through a resistor 272 to the base of a transistor 273, the emitter of which is grounded and the collector of which is connected to the output conductor 126 and also connected through a resistor 274 to the source of positive potential. The purpose of the transistor 273 is to make the potential of the conductor 126 high when that of the conductor 125 is low and vice versa. The SCR 269 may be rendered conductive immediately by the application of a positive potential to the conductor 275 which is connected to the gate electrode of the SCR 269. The conductor 275 is also connected to the cathode of a diode 276, the anode of which is connected through a resistor 277 to the collector of a transistor 278. The emitter of the transistor 278 is grounded while the collector is connected through a resistor 279 to the source of positive potential. The base of the transistor 278 is connected through a resistor 280 to a junction 281 which is also connected through a resistor 282 to the source of positive potential. The junction 281 is also connected to the anodes of a plurality of diodes, the cathode of one of which is connected to the hundreds place output conductor 263 and the cathodes of the others of which are connected to the tens place output conductors of the shift memory circuits for the digits 2 to 9 inclusive. In the absence of an output signal, the output conductors of the various shift memory circuits are at high potential and accordingly, the aforementioned diodes are back biased so that the junction 281 is at a high potential. Accordingly, the transistor 278 is conductive and its collector is at a relatively low potential. It is obvious that if an output signal (low potential) appears on any of the tens place output conductors of any of the shift memory circuits 2 to 9 inclusive, or on the hundreds place output conductor, then a current will flow through the resistor 282 thereby lowering the potential of the junction 281 and rendering the transistor 278 nonconductive. The resulting high potential of the collector of the transistor 278 is transmitted through the resistor 277 and the diode 276 to the gate electrode of the SCR 269 thereby rendering it conductive and generating an output. It is to be noted that there is no time delay involved in this operation.

The above described circuit including the transistor 278 nullifies any attempt to register a call for the non existent floors numbered 200 and above. Provision is also made for nullifying attempts to register calls for the non existent floors 130 to 199. This is done by sensing the presence of a signal in the units place representing any one of the digits 3 to 9 inclusive simultaneously with the presence of a signal in the tens place representing the digit 1, and triggering the SCR 269 immediately in response thereto. More specifically, the conductor 275 is also connected to the cathode of a diode 283 the anode of which is connected through a resistor 284 to the collector of a transistor 285 which collector is also connected through a resistor 286 to the positive voltage source while the emitter is grounded. The base of the transistor 285 is connected through a resistor 287 to a junction 288 which is connected to ground through a resistor 289. The junction 288 is also connected to the cathode of a diode 290 the anode of which is connected directly to the tens place output conductor 262 of the shift memory circuit 203 for the digit 1. The junction 288 is also connected to the cathode of a diode 291 the anode of which is connected to a junction 292. The junction 292 is connected through a resistor to the positive voltage source and is also connected to the anodes of a plurality of diodes, the cathodes of which are each connected to a different one of the units place output conductors of the shift memory circuits for the digits 3 to 9 inclusive.

In the absence of a signal, the conductor 262 is at a high potential and a current flows through the diode 290 and the resistor 289, placing the junction 288 at a high potential, thus rendering the transistor 285 conductive and placing its collector at a low potential. It is to be noted that whenever the conductor 262 is at a high potential, the junction 288 is also at a high potential regardless of the potential of the junction 292. In the absence of a signal representing any of the units place digits 3 to 9 inclusive, the junction 292 is at a high potential and current flows through the diode 291 and the resistor 289 placing the junction 288 at a potential which can be considered high for present purposes. Such high potential is maintained as long as the junction 292 is at a high potential, regardless of the potential of the conductor 262. But if there is a signal (low potential) on any output conductor representing any of the units place digits 3 to 9 inclusive and if simultaneously there is a signal (low potential) on the tens place conductor 262 for the digit 1, then the junction 288 will be at a low potential, the transistor 285 will be nonconductive, the collector potential will be high and a high potential will be transmitted through the resistor 284, the diode 283 and the conductor 275 to the gate electrode of the SCR 269, turning it on. It is to be noted that there is substantially no delay from the time the condition (signals representing the digit 1 in the tens place and one of the digits 3 to 9 inclusive in the units place) is sensed until the SCR 269 is turned on to generate an output signal.

It is preferred that the register lamp be illuminated a predetermined time after each passenger first actuates any one of the floor buttons, provided that he has not already actuated the "Register" button. To accomplish this, the units place output of each and every shift memory circuit is connected through its individual diode to a junction 294. The junction 294 is connected through a resistor 295 to the source of positive potential and is also connected through a resistor 296 to the base of a transistor 297. The emitter of the transistor 297 is grounded, while the collector thereof is connected through a resistor 298 to the source of positive potential. The collector is also connected through serially connected resistors 299 and 300 to a junction 301 which in turn is connected through a capacitor 302 to ground. The junction 301 is also connected to the anode of a diode 303, the cathode of which is connected to one terminal of a resistor 304, the other terminal of which is connected to the collector of the transistor 297. The junction 301 is also connected to the emitter of a uni-junction transistor (UJT) 305, the second base of which is connected through a resistor 306 to the source of positive potential and the first base of which is connected through a resistor 307 to ground. The junction 301 is also connected through a diode 308 to the anode of the SCR 269. The first base of the UJT 305 is also connected through a resistor 309 and a diode 310 to the gate electrode of the SCR 269.

In the absence of signals, the output conductors of the various shift memory circuits are at high potential and accordingly, the junction 294 is also at a high potential thereby rendering the transistor 297 conductive and placing its collector at a low potential. If a signal (low potential) should appear on the units place output conductor of any of the shift memory circuits, a current would flow from the source of positive potential through the resistor 295 to that conductor bearing the low potential thereby reducing the potential of the junction 294 and rendering the transistor 297 nonconductive. The high potential on the collector of the transistor 297 will then cause a current to flow through resistors 299 and 300 and start to charge the capacitor 302. After a predetermined time, preferably on the order of five seconds or so, the potential of the junction 301 rises sufficiently to cause the UJT 305 to become conductive thereby raising the potential of its first base which increased potential is passed through the resistor 309 and the diode 310 to the gate electrode of the SCR 269 thereby rendering this SCR conductive. As a result, the potential of the output conductor 126 will be shifted from low to high while the potential of the conductor 125 will be shifted from high to low. At the same time, a current will flow from the 6-volt source through the lamp 127, a diode 311 and the SCR 269 to ground, thereby illuminating the lamp. The low potential of the conductor 125 blocks the AND gate 67 (FIGURE 2) so as to render further actuation of floor buttons ineffective. The high potential on conductor 126 initiates operation of a timing circuit in the power control circuit 151 as will be more fully explained.

FLOOR LIMITING CIRCUIT

It will be recalled from the above discussion of the register control circuit that the registration of certain erroneous floor calls, such as for floors 130 or 140, are prevented. However, that circuit does not prevent registration of calls for floors 128 or 129, which floors do not exist in our example. It is the purpose of the floor limiting circuit to prevent registration of such calls.

Obviously, calls for floors 128 or 129 start by actuation of the one and two floor buttons so that the digit 1 appears in the tens place and the digit 2 appears in the units place. The floor limiting circuit recognizes this condition and, upon its occurrence, prevents registration of either the digit 8 or the digit 9 subsequent thereto.

Referring now to FIGURE 14, the units place conductor 48 from the digit 2 shift memory circuit is connected through a resistor 312 to the base of a transistor 313, the emitter of which is grounded while the collector thereof is connected through a resistor 314 to the source of positive potential and is also connected to the cathode of a diode 315, the anode of which is connected to a junction 316. Similarly, the tens place conductor 262 from the digit 1 shift memory circuit is connected through a resistor 317 to the base of a transistor 318. The emitter of the transistor 318 is grounded while the collector is connected through a resistor 319 to the source of positive potential and is also connected to the cathode of a diode 320, the anode of which is also connected to the junction 316. This junction is connected through a resistor 321 to the source of positive potential and is also connected through another resistor 322 to the base of a transistor 323 the emitter of which is grounded. The collector of the transistor 323 is connected through a resistor 324 to the source of positive voltage and is also connected to the output conductor 123.

In the absence of signals on the conductors 48 and 262, both are at a high potential and accordingly both of the transistors 313 and 318 are conductive, thus making the potential of both collectors low. As long as either collector is at a low potential, the junction 316 will also be at a low potential. The potential of junction 316 will be high when and only when there is a signal (low potential) on both of the conductors 48 and 262, that is, when and only when the digit 1 is stored in the tens place and the digit 2 is stored in the units place. The transistor 323 makes the potential of the output conductor 123 the opposite of that of the junction 316. That is, the potential of the output conductor 123 is normally high but becomes low when and only when the digit 1 is stored in the tens place and the digit 2 is stored in the units place. The manner in which this prevents the registration of calls for the non-existent floors 128 and 129 will be explained in connection with FIGURE 2.

Returning to FIGURE 2, the switches for the floor buttons 8 and 9 are connected through small current limiting resistors 325 and 326 respectively to junctions 327 and 328 respectively. These junctions are connected to their respective associated data status circuits. Additionally, each of these junctions is connected through its associated resistor and diode to the conductor 53 in the same way and for the same purpose as the resistor 51 and diode 52 previously discussed in connection with the number 2 floor button, that is, to place a high potential on the conductor 53 when the associated button is actuated. The junction 327 is also connected to the anode of a diode 329 the cathode of which is connected to the conductor 123 and the junction 328 is similarly connected to the anode of a diode 330 the cathode of which is also connected to the conductor 123.

It will be recalled that the conductor 123 is normally at a high potential and normally has no effect on the operation of floor buttons 8 and 9 so that when either is actuated a high potential is placed on its associated data status circuit and also on the conductor 53. However, when the digit 1 is stored in the tens place and the digit 2 is stored in the units place, the conductor 123 is at a low potential so that if either the "8" or the "9" floor button is actuated, current will flow either through resistor 325 and diode 329 or through resistor 326 and diode 330 to conductor 123 thereby holding the associated junction, 327 or 328 at a low potential so that neither the data status circuit nor the pulse generator is actuated. From the passenger's point of view, nothing happens. But if he actuates any one of the floor buttons 0 to 7 inclusive, the floor so selected will be displayed in the usual manner and can be registered by actuating the register button 23.

POWER CONTROL CIRCUIT

It will be recalled from the previous discussion in connection with FIGURE 2, that the purpose of the power control circuit 151 is to reset the apparatus so as to be in condition to accept another floor call. This it does by disconnecting the source of positive voltage momentarily. This disconnection is performed in response to (1) manual actuation of the error switch 24, (2) the transmission of a floor call to the machine room, (3) the receipt of an error signal from the error detecting circuit 171, or (4) the receipt of a signal from the register control circuit 124.

Referring now to FIGURE 15, an SCR 331 has its cathode grounded and its anode connected through the operating winding 332 of a relay to a junction 333. The winding 332 is shunted by a diode 334 to provide a discharge path for the winding so as to protect the SCR 331. The gate electrode of the SCR 331 is connected to a junction 335 and is also connected through a resistor 336 to ground. The junction 333 is connected to the positive terminal of a source of voltage, shown schematically in FIGURE 15 as comprising the battery 152, the negative terminal of which is grounded. The junction 333 is also connected through a resistor 338 to a junction 339, which junction in turn is connected through normally open contacts K2 to ground. The junction 339 is also connected through a capacitor 341 to the anode of the SCR 331. The junction 333 is also connected to one terminal of normally closed contacts K1, the other terminal of which is connected to all of the terminals in FIGURES 1 to 15 inclusive, which are marked "+."

Initially, the SCR 331 is nonconductive with the result that its anode is at a high potential. Similarly, the junction 339 is also at a high potential, because of its connection through resistor 338 to the junction 333. Accordingly, the capacitor 341 has little or no charge at this time. The SCR 331 may be rendered conductive by a positive pulse applied to the junction 335 which pulse is applied by circuits to be described subsequently. When so rendered conductive, the anode potential falls and the capacitor 341 starts to charge, preferably obtaining a substantial charge in a few milliseconds. Soon thereafter, the current through the winding 332 of the relay "K" builds up sufficiently to actuate this relay thereby opening the normally closed contacts K1 thereby removing the source of positive voltage from all of the equipment so far described in connection with FIGURES 1 through 14. This has the effect of resetting everything to its initial condition. The closing of the contact K2 suddenly reduces the potential of the junction 339 and this reduction in potential is passed through the capacitor 341 to the anode of the SCR 331 thereby rendering it nonconductive. The relay "K" drops out, the contact K1 closes and the contact K2 opens thereby restoring initial conditions.

A positive potential may be impressed on the junction 335 in any one of four ways. First, actuation of the manually operable error button 24 causes a current to flow through resistor 343 the voltage drop across which is passed through a capacitor 344, a resistor 345 and a diode 346 to the junction 335. There is little or no time delay in this operation so that the SCR 331 is rendered conductive almost immediately upon actuation of the button 24.

Second, the transmission of a signal to the machine room by the actuation of the relay "G" causes one of the contacts of this relay, the contact G10, to apply a positive voltage through a resistor 348 and a resistor 349 to a junction 351. A capacitor 352, connected between the junction 351 and ground, starts to charge. The rising potential of the junction 351 is applied through a resistor 353 and a diode 354 to the junction 335. When this potential has risen sufficiently, the SCR 331 will be rendered conductive. The time delay introduced by the capacitor 352 is preferably on the order of a few milliseconds. This delay determines the length of the signal pulse transmitted to the machine room because, as soon as relay "G" is energized, it starts the process by which the relay "K" is energized which in turn de-energizes the relay "G" by removing the source of positive voltage therefrom.

Third, any positive output voltage generated by the error detecting circuit 171 is applied by the conductor 175 through a diode 356 to a junction 357.

Fourth, a high potential signal generated by the register control circuit 124 and appearing on the conductor 126 is applied through a diode 258 to the junction 357.

The potential of the junction 357 is passed through a delay circuit which includes a uni-junction transistor (UJT) 361 and a capacitor 362, which circuits may be similar to those described in connection with the UJT 74 of FIGURE 5 and also similar to that described in connection with the UJT 303 of FIGURE 13. This circuit provides a delay of five seconds or so after which a positive pulse is transmitted from the first base of the UJT 361 to the junction 335, thereby rendering the SCR 331 conductive.

MACHINE ROOM

Referring now to FIGURE 16, there is shown the apparatus in the machine room which is required to make the previously discussed signals available in usable form. There are shown the nine conductors from the Binary Encoder 128 (FIGURE 2) including the four conductors 131 to 134 inclusive representing the units place, four similar conductors 135 to 138 representing the tens place and a single conductor 139 representing the hundreds place. Nine relays are provided and one of each of these conductors is connected to one terminal of each of the relays. The conductors 131 to 134 are connected to relays A, B, C and D respectively; the tens place conductors 135 to 138 are connected to one terminal of relays AX, BX, CX and DX respectively; and the hundreds place conductor 139 is connected to one terminal of relay H. The other terminals of all of these relays are connected together and to a source of positive potential. It will be recalled that the output conductors from the Binary Encoder are each at a high potential in the absence of a signal and that the presence of a signal from the shift memory circuit is denoted by a low potential on the appropriate conductor. Therefore, when the relay G (FIGURE 2) operates, those relays A, B, etc., whose corresponding conductors carry a signal (low potential) will be energized. Each of these relays has many contacts whose function will be considered as the description proceeds.

Each of the above mentioned nine relays has a normally open contact A1, B1, etc. All of these contacts are connected in parallel with each other between the source of positive voltage and one terminal of a relay Y, the other terminal of which is grounded. Accordingly, when any one or more of the aforementioned nine relays is energized, the relay Y will also be energized and will remain energized as long as any of these aforementioned nine contacts remains closed. Energization of the relay Y closes contacts Y1 and Y2, thereby enabling a units place decoding matrix 371 and a tens place decoding matrix 372. The former is illustrated in FIGURE 17.

Referring now to FIGURE 17, the closure of the contact Y1 connects a source of voltage which, for example, may be 20 volts negative with respect to ground, to a matrix of contacts of the relays A, B, C and D. Four places in the Binary Code has a capacity of 16 bits but since we are only interested in 10 bits (0–9 inclusive) the decoding matrix can be somewhat abbreviated. The operation of the matrix is straightforward as can be seen by considering an example. Suppose that, of the units place output conductors, only the conductor 132 has a signal thereon so that the relay B and only the relay B is energized. This condition corresponds to the Binary #0010, which should be decoded as the decimal digit 2. As shown in FIGURE 17, the minus 20 volts potential is transmitted through contacts C3, B2, A5 and D3 to the decimal 2 output conductor. Examples of other Binary numbers can be traced in a similar fashion to the corresponding decimal output conductors.

The matrix 372 is similar to the matrix 371 except that the contacts are those of the relays AX, BX, CX and DX instead of the relays A, B, C and D. Another distinction is that the source of voltage applied through the contact Y2 is preferably 120 volts positive with respect to ground.

The outputs of both of the matrices 371 and 372, consisting as they do of ten conductors each, are connected to two lamp and resistor matrices 381 and 382. The matrix 381 generates and stores a signal indicative of any one or more of floor numbers 0 to 99 inclusive, while the matrix 382 generates and stores a signal indicative of any one or more of floor numbers 100 to 127 inclusive. Each matrix is supplied with an additional source of positive voltage of about 100 volts. All ten of the conductors from the units place matrix 371 are connected directly to both matrices 381 and 382. However, the conductors representing the tens places of 0, 10 and 20 are connected through normally closed contacts H2, H3 and H4 respectively to the matrix 381 and are connected through normally open contacts H5, H6 and H7 respectively to the matrix 382. The remainder of the tens place conductors from the matrix 372 are connected directly to the matrix 381 but need not be connected at all to the matrix 382. The matrix 381 is shown in more detail in FIGURE 18.

Referring now to FIGURE 18, there is shown a matrix of 100 lamps such as small neon glow lamps and their associated resistors which are shown schematically in the drawing as arranged in vertical columns and horizontal rows. A typical column and row will be described from which an extension to the entire matrix should be obvious. The tens place conductor representing the number 20 is connected to one electrode of each of ten lamps, arranged in a vertical column, which represents the numbers 20 to 29 inclusive. The other electrode of each lamp is connected to its corresponding output conductor and is also conected through a resistor to a conductor representing one of the ten units place digits. For example, the lamp 390, representing 22, has one electrode connected directly to the "20" conductor while the other electrode is connected to an output conductor 391 and is also connected through a resistor 392 to a conductor 393. The conductor 393 is shown as extending horizontally across and is connected to those resistors which are connected to those lamps corresponding to those numbers having the digit "2" as the second digit, that is, to lamps representing 12, 22, 32, etc. The conductor 393 in turn is connected through a resistor 394 to ground. A source of voltage, for example 100 volts positive with respect to ground, is connected through a diode 395 to the input conductor representing 20 (and is also connected through additional diodes to input conductors representing 0, 10, 30, etc.).

The various voltages which have been mentioned are illustrative and must be selected in conjunction with the characteristics of the lamps used. The voltages mentioned that is, minus 20 volts, plus 100 volts and plus 120 volts are suitable for use with lamps which have a breakdown voltage of 130 to 140 volts and which have a sustaining voltage of 70 to 80 volts. The description of the operation will assume these voltages and lamps.

In the absence of any signal on either the tens or units place input conductors, the voltage across the lamps will be only 100 volts and none will be illuminated. With a voltage on one of the tens place conductors only, for example, the "20" conductor, the voltage accross the ten lamps connected thereto will be only 120 volts which is still below the breakdown voltage of the lamps. If there is no voltage on any of the tens place conductors but a voltage on one of the units place conductors, say the "1" conductor the maximum applied voltage will still be 120 volts which is below the breakdown voltage. However, if there is a voltage on say the tens place conductor "20" and the units place conductor "2" then the voltage across the lamp 390 will be 140 volts, the lamp will conduct, and a voltage will appear on the output conductor 391. This is the only lamp which will be conductive because the maximum voltage on the other lamps is 120 volts. It is to be noted that when either or both of the input voltages is removed, the voltage on the lamps will remain at 100 volts and any lamp previously lighted will remain illuminated until the 100 volt source is interrupted. The lamps thus represent a visual indication of the car call while the voltage on the various conductors such as the conductor 391 constitutes an electrical signal representing the same call.

The matrix 382 may be quite similar to the matrix 381. However, it is only necessary that there be three vertical columns, those representing the tens place numbers 0, 10 and 20 since there are only 127 floors in our assumed example. It is also to be noted that the normally open contacts H5, H6 and H7 (shown in FIGURE 16) render the matrix 382 ineffective unless there is a signal in the hundreds place. Similarly, the normally closed contacts H2, H3 and H4 make the matrix 381 ineffective when there is a signal on the hundreds place conductor.

The subject car call signalling system is preferably combined with a conventional car call registering means, such as the conventional car call registering means that is shown in FIGURE 2 of U.S. Patent No. 3,149,305 of W. F. Glaser et al., issued Sept. 15, 1964. For example, the conductor 391 for floor landing 1, which is shown on FIGURE 18 of the subject application, can be connected to the line between car button 1SC and contact 1C, which is shown on FIGURE 2 of the above mentioned U.S. Patent No. 3,149,305. In addition, the conductor 391 for each floor landing of the subject application, can be connected to the respective line between the respective car button and contact for the corresponding floor landing of said Patent No. 3,149,305. In this way, the individual car buttons 1SC, 2SC, 3SC, TSC, which are shown in FIGURE 2 of Patent No. 3,149,305, can be replaced by the ten-digit panel of the subject car call signalling system, which is shown in FIGURE 1 of the subject application. In operation, each conductor 391 of the subject application can provide an electrical signal for registering the car call for the floor landing corresponding thereto.

CONCLUSION

From the foregoing description it will be apparent that the applicant has provided an improved car call signalling system in which all of the necessary buttons can be accommodated in a comparatively small space and can accommodate any number of floors likely to be required in the near future. The same panel can be used for any number of floors. It is also to be noted that only nine hoistway conductors, plus a common conductor are required regardless of the number of floors to be served.

A preferred embodiment has been described in detail, and many modifications thereto may occur to those skilled in the art. It is intended that the particular embodiment which has been described be typical of all such modified embodiments.

What is claimed is:

1. In an elevator system, including, an elevator car, and apparatus for raising said car, for lowering said car and for stopping said car at selected floor landings, said apparatus having car call registering means for registering car calls; a car call signalling system connected to said car call registering means, said signalling system comprising, first manually operable means for selecting digits and for recording and storing successively discrete signals each corresponding to one of the digits of a single or plural digit decimal number identifying a desired floor landing stop, second manually operable means for transmitting the signals so stored, means for receiving the signals, a first plurality of conductors interconnecting said signal transmitting means and said signal receiving means, and a second plurality of conductors connected to said signal receiving means for placing the signals on the car call registering means.

2. An elevator system according to claim 1 in which said first manually operable means includes means for storing said discrete signals in decimal form and further includes means for continuously converting each of said discrete signals to a binary digital form, wherein said storage means includes a units place storage portion and a tens place storage portion, and wherein said converting means includes a units place converter portion and a tens place converter portion.

3. In an elevator system including, an elevator car, and apparatus for raising said car, for lowering said car and for stopping said car at selected floor landings, said apparatus having car call registering means for registering car calls; a car call signalling system connected to said car call registering means, said signalling system comprising, manually operable means, mounted in said car in a position to be readily accessible for actuation by passengers, for selecting digits and for generating signals indicative of any one of the digits zero to nine inclusive, storage means responsive to successive actuation of said manually operable means for temporarily storing signals indicative of the single or plural digit number of that floor landing identified by the digits corresponding to the signals so generated, means for transmitting the signals so stored and for clearing said storage means, whereby said storage means is conditioned to respond to further actuation of said manually operable means, means for receiving the signals, a first plurality of conductors interconnecting said signal transmitting means and said signal receiving means, and a second plurality of conductors connected to said signal receiving means for placing the signals on the car call registering means, said second plurality of conductors being equal in number to said plurality of floor landings, and said first plurality of conductors being fewer in number than said plurality of floor landings.

4. An elevator system according to claim 3 in which said signal receiving means includes memory matrix means responsive to each such transmission of signals for generating a decimal digital signal and a visual display, each identifying the corresponding floor landing.

5. In an elevator system, including, an elevator car serving a plurality of floor landings, and apparatus for raising said car, for lowering said car and for stopping said car at selected floor landings, said apparatus having car call registering means for registering car calls; a car call signalling system connected to said car call registering means, said signalling system comprising, manually operable means, mounted in said car in a position to be readily accessible for actuation by passengers, for selecting digits and for generating signals indicative of any one of the digits zero to nine inclusive, storage means responsive to sequential actuation of said manually operable means for storing signals indicative of the single or plural digit number of that floor landing identified by the digits corresponding to the signals so generated, means for transmitting the signals so stored over said conductors and for clearing said storage means, whereby said storage means is conditioned to respond to further actuation of said manually operable means, means for receiving the signals, a first plurality of conductors interconnecting said signal transmitting means and said signal receiving means, and a second plurality of conductors connected to said signal receiving means for placing the signals on the car call registering means, wherein said signal transmitting means includes a binary encoding mechanism, and wherein said signal receiving means includes a binary decoding mechanism.

6. An elevator system according to claim 5 in which said second plurality of conductors is equal in number to the number of landings served by said car and said signal receiving means includes means responsive to each transmission of signals thereto as aforesaid for placing a signal on that one of said second plurality of conductors which corresponds to the floor landing identified by said transmitted signals.

7. An elevator system according to claim 5 in which said signal receiving means includes a plurality of visual indicators equal in number to the number of landings served by said car and also includes memory means responsive to each transmission of signals thereto as aforesaid for actuating that one of said indicators which corresponds to the floor landing identified by said transmitted signals.

8. An elevator system according to claim 7 in which said second plurality of conductors is arranged with one conductor associated with each of said visual indicators, and said memory means is responsive to actuation of any of said indicators for placing a signal on the conductor associated therewith.

9. In an elevator system, including, an elevator car, and apparatus for raising said car, for lowering said car and for stopping said car at selected floor landings, said apparatus having car call registering means for registering car calls; a car call signalling system connected to said car call registering means, said signalling system comprising, first manually operable means, mounted in said car in a position to be readily accessible for actuation by passengers, for selecting digits and for generating signals indicative of any one of the digits zero to nine inclusive, storage means responsive to sequential actuation of said first manually operable means for storing signals indicative of the single or plural digit number of that floor landing corresponding to the signals so generated, means operable by the signals so stored for visually displaying characters indicative of the aforesaid identified floor landing, second manually operable means for transmitting the signals so stored and for terminating the visual display of said characters, means for receiving the signals so transmitted, and means for destroying the signals so stored and for terminating the visual display of said characters if the signals are not transmitted to the signal receiving means within a predetermined interval.

10. In an elevator system, including, an elevator car serving a plurality of floor landings, and apparatus for raising said car, for lowering said car and for stopping said car at selected landings, said apparatus having car call registering means for registering car calls; a car call signalling system connected to said car call registering means, said signalling system comprising, a digit selector mechanism having ten buttons, mounted in said car in a position to be readily accessible for actuation by passengers, each button corresponding to a different one of the digits zero to nine inclusive, storage means responsive to successive button actuations for temporarily storing signals indicative of the single or plural digit number of that floor landing identified by the digits corresponding to the buttons so actuated, means for transmitting the signals so stored to said apparatus and for dropping them from temporary storage, whereby said system is conditioned to respond to further actuation of said buttons, means for receiving the signals, a first plurality of conductors interconnecting said signal transmitting means and said signal receiving means, and a second plurality of conductors connected to said signal receiving means for placing the signals on the car call registering means, said second plurality of conductors being equal in number to said plurality of floor landings, and said first plurality of conductors being fewer in number than said plurality of floor landings.

11. An elevator system in accordance with claim 10 in which said storage means responsive to button actuation includes means for storing separately signals indicative of the decimal digits corresponding to each discrete button actuation, said storage means including a units place storage portion and a tens place storage portion, and further comprises means for continuously converting and storing each of said last named signals to an equivalent binary digital form, said converting means including a units place converting portion and a tens place converting portion, and in which said means for transmitting includes means for accepting and transmitting the signals in their aforesaid binary digital form.

12. An elevator system according to claim 11 further comprising means actuated by said stored signals indicative of decimal digits for visually displaying numerals corresponding thereto.

13. An elevator system according to claim 12 in which said signal receiving means has a binary decoding means, said binary decoding means having a units place decoding portion and a tens place decoding portion.

14. An elevator system according to claim 13 in which said signal receiving means includes a plurality of visual indicators equal in number to and each corresponding to a different one of said plurality of floor landings, and further includes means responsive to each receipt of signals over said first plurality of conductors for actuating that one of said indicators which correspond to the floor landing identified by such signals.

15. An elevator system according to claim 14 in which said second plurality of conductors has one conductor associated with each of said visual indicators, and further comprising means responsive to the actuation of each of said indicators for placing a signal on its associated conductor.

16. In an elevator system, including, an elevator car, and apparatus for raising said car, for lowering said car and for stopping said car at selected floor landings, said apparatus having car call registering means for registering car calls; a car call signalling system connected to said car call registering means, said signalling system comprising, a digit selector mechanism having ten buttons, mounted in said car in a position to be readily accessible for actuation by passengers, for designating sequentially the individual digits of single or plural digit numbers identifying desired floor landing stops, each of said buttons corresponding to a different one of the digits zero to nine inclusive, ten signal storage devices, each including a units place storage component and a tens place storage component, each device associated with a different one of said buttons, means responsive to actuation of one of said buttons for placing a signal in the units place storage component of its associated storage device, means jointly responsive to the presence of a signal stored in one of said units place components and to actuation of one of said buttons for placing a signal in the tens place component of that storage device which had a signal stored in its units place component, means for continuously converting said stored units place signal to a first binary digital signal corresponding thereto, and for similarly converting said stored tens place signal to a second binary digital signal corresponding thereto, manually operable means for transmitting said binary digital signals to said apparatus, means for receiving the signals, a first plurality of conductors interconnecting said signal transmitting means and said signal receiving means, and a second plurality of conductors connected to said signal receiving means for placing the signals on the car call registering means.

References Cited

UNITED STATES PATENTS

| | | | |
|---|---|---|---|
| 2,474,861 | 7/1949 | Putt | 187—29 |
| 2,567,812 | 9/1951 | Hickman. | |
| 2,576,099 | 11/1951 | Bray et al. | |
| 3,243,517 | 3/1966 | Miller et al. | |
| 3,307,156 | 2/1967 | Durr | 340—172.5 |

JOHN W. CALDWELL, Primary Examiner

KENNETH N. LEIMER, Assistant Examiner

U.S. Cl. X.R.

340—166, 324, 365